(12) United States Patent
Chitti et al.

(10) Patent No.: US 9,723,002 B2
(45) Date of Patent: Aug. 1, 2017

(54) PROTECTING ACCESS TO A HARDWARE DEVICE THROUGH USE OF AN AGGREGATE IDENTITY INSTANCE

(71) Applicant: INTERNATIONAL BUSINESS MACHINES CORPORATION, Armonk, NY (US)

(72) Inventors: Mark V. Chitti, Lexington, KY (US); Kirby G. Dahman, Seattle, WA (US); Ronda L. McCain, Longmont, CO (US); Kurt A. Rybczyk, Waterbury, CT (US); Keith C. Williams, Fenton, MO (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 14/986,747

(22) Filed: Jan. 4, 2016

(65) Prior Publication Data

US 2017/0195328 A1   Jul. 6, 2017

(51) Int. Cl.
*G06F 7/04* (2006.01)
*H04L 29/06* (2006.01)

(52) U.S. Cl.
CPC ...... *H04L 63/0884* (2013.01); *H04L 63/0471* (2013.01); *H04L 63/083* (2013.01); *H04L 63/0876* (2013.01)

(58) Field of Classification Search
CPC ............. H04L 63/0884; H04L 63/0471; H04L 63/083; H04L 63/0876

(Continued)

(56) References Cited

U.S. PATENT DOCUMENTS

| 7,243,368 B2 * | 7/2007 | Ford | G06F 21/31 709/229 |
| 8,468,244 B2 * | 6/2013 | Redlich | G06Q 10/06 705/50 |

(Continued)

OTHER PUBLICATIONS

Yogachandran et al., "Assessing Data Breach Risk in Cloud Systems," 2015 IEEE 7th International Conference on Cloud Computing Technology and Science (CloudCom) Year: 2015 pp. 363-370.*

(Continued)

*Primary Examiner* — Roderick Tolentino
(74) *Attorney, Agent, or Firm* — John R. Pivnichny; Law Office of Jim Boice

(57) ABSTRACT

A computer-implemented method, system, and/or computer program product controls access to an appliance. A host system receives, from a client computer, appliance-specific user data that includes a user password, a user-created name of an appliance, a user identifier, and a network address of the client computer, and then concatenates the appliance-specific user data with a host name of the host system to create and store an Aggregate Identity Instance (AII) in the host system. The host system receives, from the client computer, a request to access the appliance, and determines whether appliance-specific user data sent with the request is in the AII in the host system. If so, then the host system matches the user-created name of the appliance to an address of the appliance; establishes a session between the client computer and the appliance; and uses the AII to encrypt and decrypt data.

20 Claims, 11 Drawing Sheets

(58) Field of Classification Search
USPC .................................................. 726/2–15
See application file for complete search history.

(56) References Cited

U.S. PATENT DOCUMENTS

| | | | |
|---|---|---|---|
| 8,726,347 B2 | 5/2014 | Hamilton et al. | |
| 8,774,403 B2 | 7/2014 | Macmillan et al. | |
| 8,879,728 B2 | 11/2014 | Macmillan et al. | |
| 9,065,655 B2 | 6/2015 | Ignatchenko | |
| 9,071,589 B1 | 6/2015 | Patnala et al. | |
| 9,094,393 B2 | 7/2015 | Hamilton et al. | |
| 2010/0214976 A1* | 8/2010 | Libes | H04L 12/2602 370/328 |
| 2014/0019757 A1* | 1/2014 | Mehtala | G06F 21/33 713/168 |
| 2014/0041002 A1* | 2/2014 | Liu | H04L 63/083 726/7 |
| 2015/0067802 A1* | 3/2015 | Baskaran | H04L 63/083 726/7 |
| 2015/0244701 A1 | 8/2015 | Hamilton et al. | |
| 2016/0014575 A1* | 1/2016 | Smith | H04L 63/105 455/466 |
| 2016/0142409 A1* | 5/2016 | Frei | H04L 63/0884 713/176 |
| 2016/0205091 A1* | 7/2016 | Matsuda | H04L 63/0823 726/7 |
| 2016/0301769 A1* | 10/2016 | Trost | H04L 67/327 |

OTHER PUBLICATIONS

Nikander et al., "Host Identity Protocol (HIP): Connectivity, Mobility, Multi-Homing, Security, and Privacy over IPv4 and IPv6 Networks," IEEE Communications Surveys & Tutorials Year: 2010, vol. 12, Issue: 2 pp. 186-204.*

P. Mell et al., "The NIST Definition of Cloud Computing", National Institute of Standards and Technology, Information Technology Laboratory, Sep. 2011, pp. 1-7.

* cited by examiner

AGGREGATE IDENTITY INSTANCE (AII) CREATION WINDOW

ENTER YOUR PASSWORD      PASSWORD1

ENTER THE TARGET DEVICE ID    DEVICE_NICKNAME

ENTER YOUR USER ID     USER@XXX.COM

301
GUI

FIG. 3

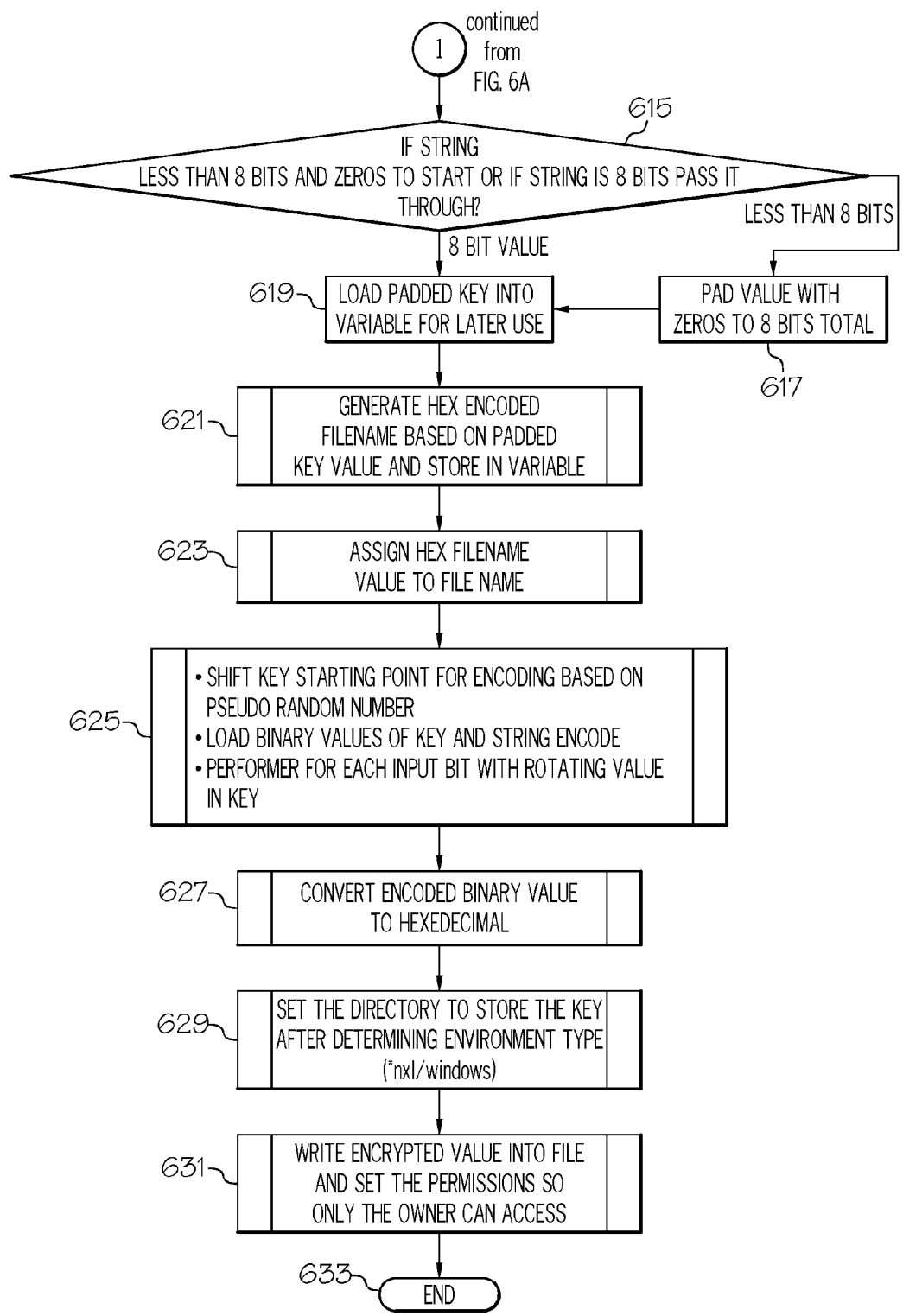

PROTECTING ACCESS TO A HARDWARE DEVICE THROUGH USE OF AN AGGREGATE IDENTITY INSTANCE

BACKGROUND

The present disclosure relates to the field of computer systems, and specifically to the field of protecting computer systems from unauthorized use. Still more particularly, the present disclosure relates to security for protecting access to appliances and other resources, such as software, computer hardware, and other types of hardware devices.

SUMMARY

A computer-implemented method, system, and/or computer program product controls access to an appliance. A host system receives, from a client computer, appliance-specific user data that includes a user password, a user-created name of an appliance, a user identifier, and a network address of the client computer, and then concatenates the appliance-specific user data with a host name of the host system to create an Aggregate Identity Instance (AII), which is stored in the host system. The host system subsequently receives, from the client computer, a request to access the appliance, and determines whether appliance-specific user data sent with the request is contained in the AII stored in the host system. In response to determining that the appliance-specific user data sent with the request is contained in the AII stored in the host system, the host system matches the user-created name of the appliance to an address of the appliance; establishes a session between the client computer and the appliance; and transmits a copy of the AII to the client computer. The host system then utilizes the AII to encrypt and decrypt data being exchanged between the client computer and the host system.

BRIEF DESCRIPTION OF THE DRAWINGS

FIG. 3 depicts an exemplary graphical user interface (GUI) used to create an Aggregate Identity Instance (AII);

FIGS. 6A-6B are a detailed flow chart of one or more steps performed by one or more processors and/or other hardware devices to protect access to an appliance in accordance with one or more embodiments of the present invention;

DETAILED DESCRIPTION

Figure 1:
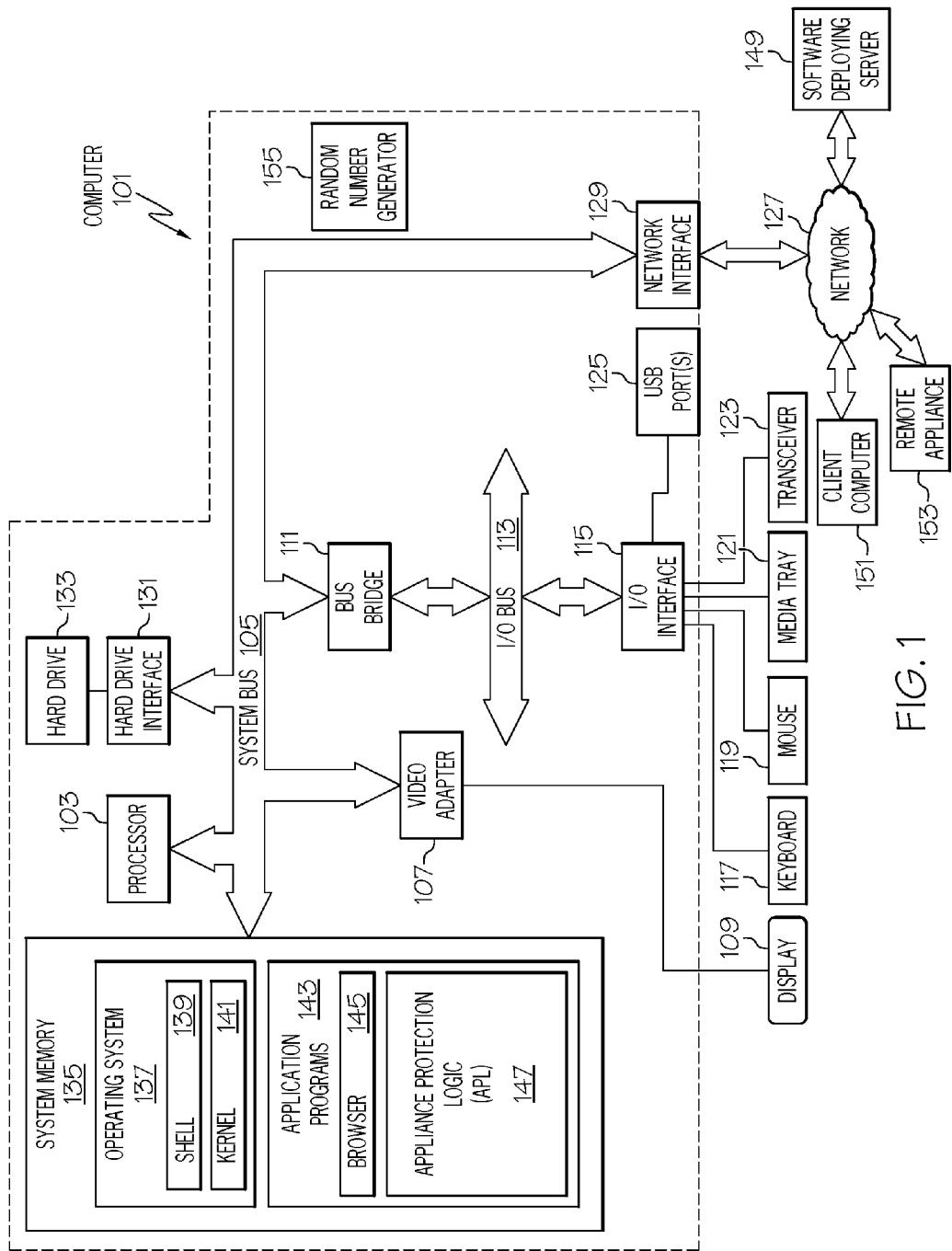
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 101 may be utilized by software deploying server 149 and/or client computer 151 and/or remote appliance 153 shown in FIG. 1, and/or host system 201, client computer 251, and/or target device 253 shown in FIG. 2.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 118, a media tray 121 (which may include storage devices such as CD-ROM drives, multi-media interfaces, etc.), a transceiver 123 (capable of transmitting and receiving electromagnetic (e.g., radio frequency, near field communication—NFC signals, etc.) signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or client computer 151 and/or remote appliance 153 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 133, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include an Appliance Protection Logic (APL) 147. APL 147 includes code for implementing the processes described below, including those described in FIGS. 2-7. In one embodiment, computer 101 is able to download APL 147 from software deploying server 149, including in an on-demand basis, wherein the code in APL 147 is not downloaded until needed for execution. Note further that, in one embodiment of the present invention, software deploying server 149 performs all of the functions associated with the present invention (including execution of APL 147), thus freeing computer 101 from having to use its own internal computing resources to execute APL 147.

Within or associated with computer 101 is a random number generator 155. While executable in software, random number generator 155 is preferably a hardware circuit that uses digital electronic inputs to output a pseudo-random number. That is, whenever the same inputs are input into random number generator 155, a same output value will be output from the random number generator 155, whether implemented in software or as a hardware circuit.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
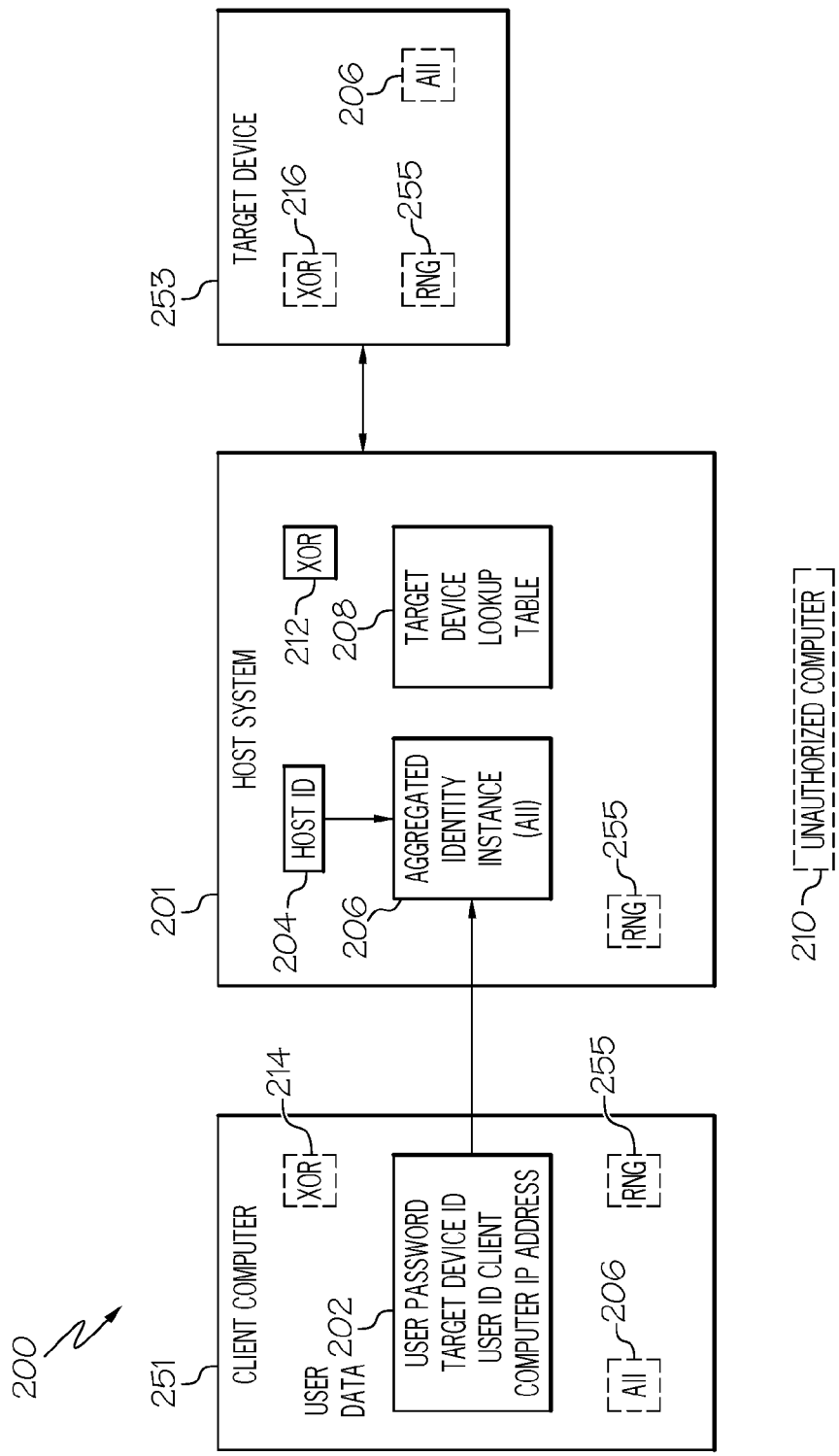
FIG. 2 illustrates additional detail of a network in which the present invention may be utilized in accordance with one or more embodiments of the present invention.

With reference now to FIG. 2, additional detail of a network 200 in which the present invention may be utilized in accordance with one or more embodiments of the present invention is presented.

A client computer 251 (i.e., a user's computer) communicates with a host system 201, which is a gateway that controls all access to a target device 253. Target device 253 may be a software appliance (e.g., a database, an application, etc.), a hardware appliance (e.g., a storage device, a computer), or a non-computing device (e.g., an actuator on a unit of equipment, etc.).

As shown in FIG. 2, a client computer 251 (analogous to client computer 151 shown in FIG. 1) allows a user to input a user password, a target device identifier (ID), and a user ID. These data elements, along with a network address (e.g., an internet protocol (IP) address) of the client computer 251 create user data 202.

The user password is preferably a password to access a particular target device or resource. That is, in a preferred embodiment of the present invention, a same user may have multiple passwords, each of which are used in providing access to a particular target device.

The target device ID is an identifier of target device 253 that is created by the user of the client computer 251, but which is not an address of target device 253, nor is it a universal (or even public) identifier of target device 253. For example, assume that the actual name/identifier of target device 253 is "RealNameTargetDevice". However, the user of client computer 251 has a "nickname" for target device 253, which is "Device_Nickname". When the user of the client computer 251 requests access to target device 251, that user does not identify target 253 by its proper name ("RealNameTargetDevice") or its universal resource locator (URL) address (e.g., "TargetDevice.xxx.com") or its Internet Protocol (IP) address (e.g., "128.98.2873.87"). Rather, the host system 201 looks up the actual name and/or address of the target device 253 in target device lookup table 208 by matching the actual name/address of the target device 253 to the user-created and user-provided "nickname" for the target device 253 (as found in the user data 202 transmitted from the client computer). Thus, if an unauthorized/improper system (e.g., unauthorized computer 210) were able to intercept a request from client computer 251 to host system 201 requesting access to target device 253, that unauthorized/improper system would not be able to ascertain which target device is being requested, since it would not know what target device is associated with the "nickname" of the target device (i.e., only the protected host system 201 knows/stores this information).

The User ID may be an e-mail address (e.g., "user@xxx.com"), a title (e.g., "Manager"), or a name (e.g., "Smith") of the person requesting access to target device 253.

As shown in FIG. 2, the user data 202 also includes a network address of the client computer 251, such as the IP address of the client computer 251 (e.g., "89.983.908.2", a URL address of the client computer 251 (e.g., "clientcomputer.xxx.com"), or a user-created name for the client computer 251 (e.g., "MyComputer"). This information auto populates the user data 202 by processors within client computer 251 interrogating settings in (i.e., addresses used by) the client computer 251.

A buffer, cache, or other storage within host system 201 holds a host ID 204, which is an identifier for host system 201. Examples of host ID 204 include, but are not limited to, an IP address of the host system 201 (e.g., "32.83.78.20"), a URL address of the host system 201 (e.g., "hostsystem.xxx.com"), or name created by the owner of the host system 201 (e.g., "Host1").

Thus, the AII 206 includes the user password, target device ID, user ID and client computer network address (user data 202) combined with host ID 204.

The AII 206 has several uses and functions in various embodiments of the present invention.

One function of AII 206 is to enable host system 201 to ascertain whether or not a request for access to target device 253 is legitimate. That is, a request to initiate a session between client computer 251 and target device 253 initially includes the user data 202. While unauthorized computer 210 may be able to identify the client computer IP address from the user data 202, only the legitimate user of client computer 251 will know the user password (especially when the user password is unique for a particular target device), the target device ID ("nickname" of the target device), and the user ID of the user of the client computer 251. Furthermore, the unauthorized computer 210 would not be able to ascertain the host ID from the host system 201, since this information is encrypted and/or behind a firewall and/or not even stored on the host system 201 (i.e., the manager of the host system 201 may have to manually enter the host ID 204 when creating the AII 206).

Another function of AII 206 is to encrypt and decrypt data being exchanged/transmitted between from client computer 251 and host system 201 and/or between host system 201 and target device 253. That is, AII 206 is a string of characters that uses exclusive OR (XOR) hardware (e.g., XOR 212) and/or software to encrypt data.

Furthermore, AII 206 is used as an input to a random number generator (RNG) 255 (analogous to random number generator 155 shown in FIG. 1), which is used in encryption/decryption operations. That is, the values/characters in AII 206 are input into RNG 255, which is a pseudo-random number generator. Thus, every time AII 206 is input into RNG 255, a same value (e.g., "3") is output. This output value (e.g., "3") determines which position in the AII 206 is the starting position for XORing with the data. For example, assume that AII 206 is the string "00100". (Obviously, AII 206 will be much more complex than five bits in order to represent all of the data in AII 206, but this simple string is used for purposes of explanation.) Thus, whenever the string "00100" is input into RNG 255, the value "3" is output.

Assume now that AII 206 is to be XORed with the data string "10110". If the original AII 206 ("00100") were XORed against the string "10110", then 00100 XOR 10110 yields the encrypted data string "10010". However, the value "3" directs the system to start XORing at the third value in AII 206, which in this case is the middle "1" in the AII string "00100". Since the starting position is now the third element in AII 206, the system will use the AII encryption string "10000" (by starting with the "1" in the middle of AII 206, using the last two zeros, and then starting over again with the first two zeros in the original AII 206). This results in "10000" being XORed with the data string "10110" such that 10000 XOR 10110=00110 (rather than 10010).

Once the AII 206 is created in the host system 201, a copy of the AII 206, along with the RNG 255, is sent to (or created within) the client computer 251 and/or the target device 253, thus allowing them to encrypt/decrypt data. The AII 206 can simply be transmitted to the client computer 251 and/or the target device 253 as a data string, as can the RNG 255 if implemented in software only. However, if the RNG 255 is executing solely in hardware, then configuration instructions are sent to a field programmable gate array (FPGA) device to "burn" the FPGA circuitry to create the RNG 255 in the client computer 251 and/or the target device 253.

While having a copy of AII 206 in the client computer 251 and/or the target device 253 somewhat compromises the security of AII 206, these copies are needed for client computer 251 and/or target device 253 to encrypt/decrypt data being exchanged with host system 201. In order to provide additional protection for the AII 206, multiple fake AIIs (not shown) are also stored in the client computer 251 and/or target device 253 in an embodiment of the present invention. Thus, unauthorized computer 210 will not know which of the AIIs (the actual AII 206 or one of the fake AIIs) provides access to the target device 253. If the unauthorized computer 210 chooses one of the fake AIIs in an attempt to access target device 253, then host system 201 locks out unauthorized computer 210 from any more attempts to access target device 253 via host system 201.

With reference now to FIG. 3, assume that a user wants to create an Aggregate Identity Instance (AII). The user thus enters into a Graphical User Interface (GUI) 301 his/her password "Password1", which preferably is to be used only when accessing the target device that this user calls "Device_Nickname". The user then identifies himself/herself as "user@xxx.com" (i.e., uses his e-mail address, although his actual name, title, or other identifier may be input by the user). This information, along with the network address (as identified by client computer 251) on which the GUI 301 is running, is consolidated into the user data 202 and sent to host system 201, where it is concatenated with the host ID 204 to create the AII 206, as shown in FIG. 2.

Figure 4:
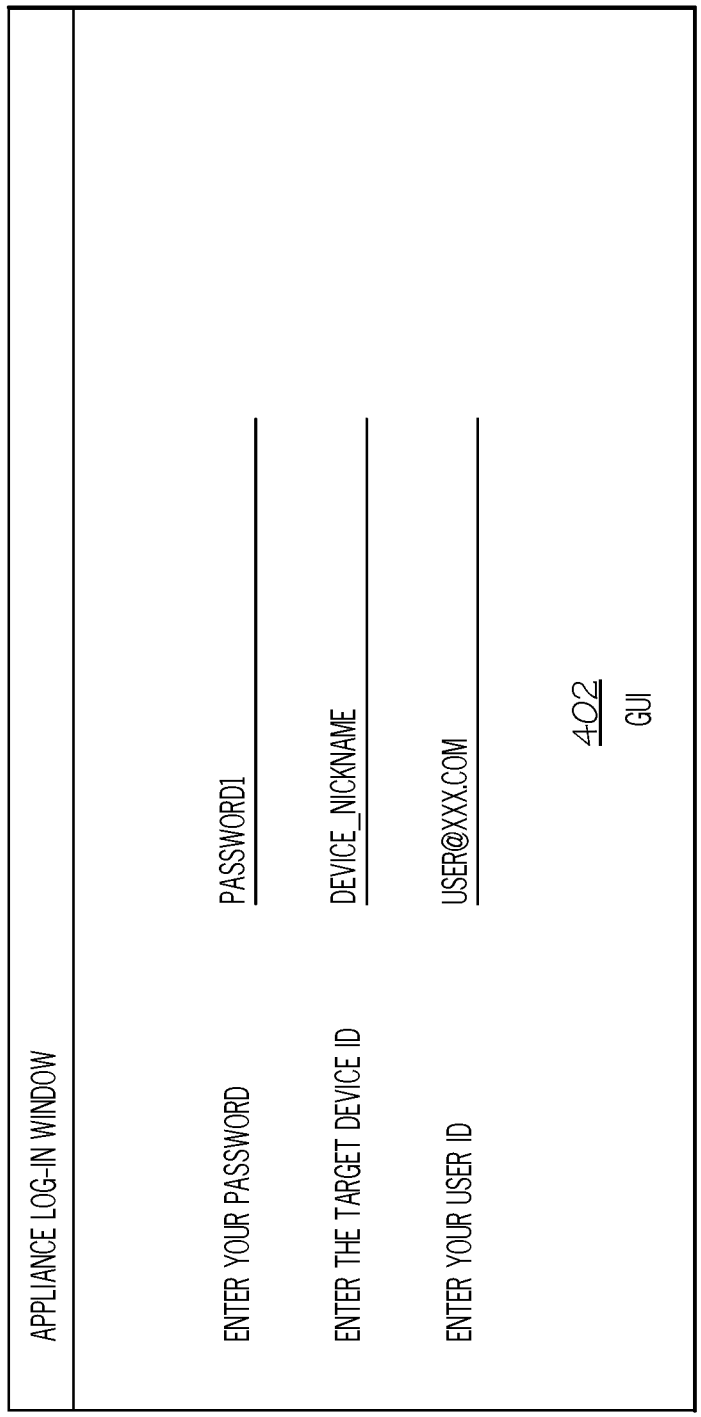
FIG. 4 illustrates an exemplary GUI used to log onto an appliance using the AII created using user inputs described in FIG. 3.
Figure 5:
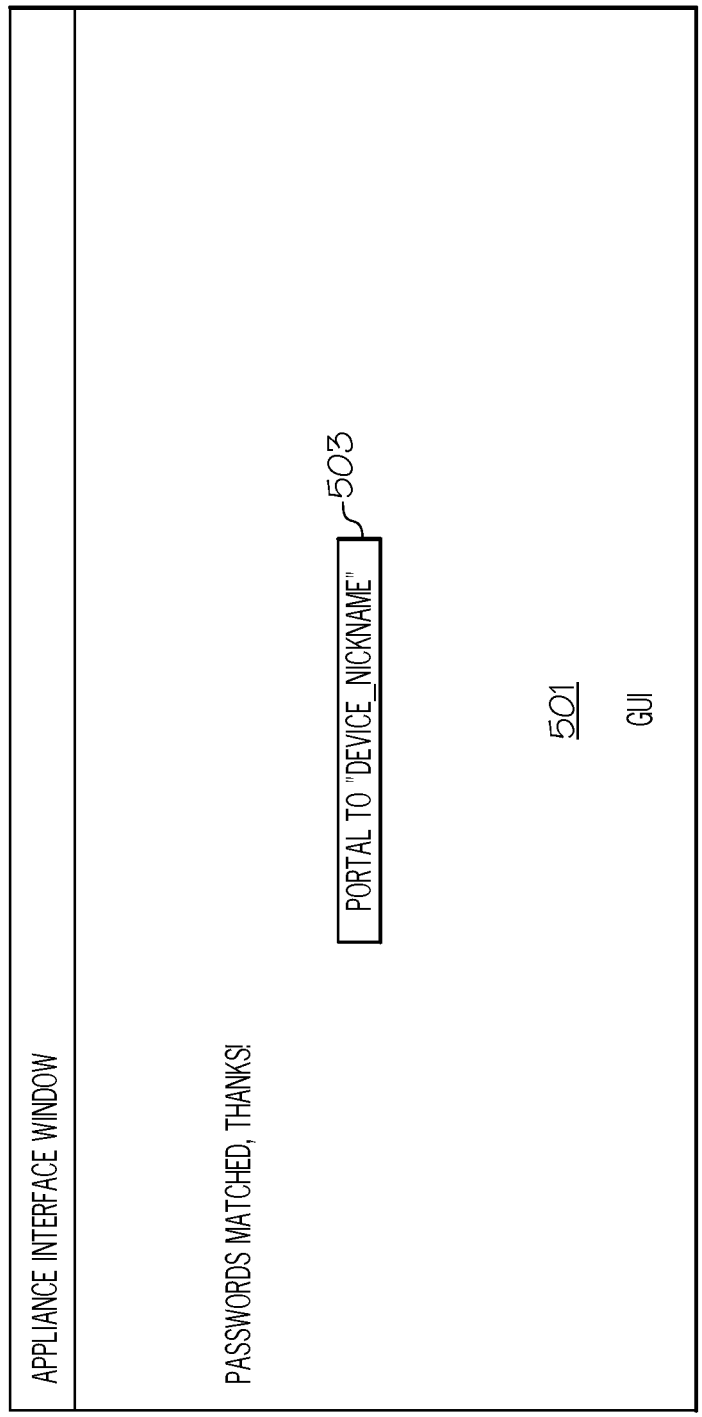
FIG. 5 depicts a portal to the appliance logged onto in FIG. 4.

Thereafter, the user will use the GUI 402 shown in FIG. 4 to request a session with target device 253 via host system 201 by re-entering his/her password, the target device ID, and his/her user ID that was used to create the AII The host system 201 will ascertain whether or not the information in the newly-entered user data from GUI 402 (which also includes the network address of client computer 251 on which GUI 402 is being displayed) matches the information in the AII 206 created by the inputs from GUI 301. If so, then GUI 501 shown in FIG. 5 will appear on the client computer 251, thus providing access to the requested target device 253 (e.g., via a portal 503).

Figure 6A:
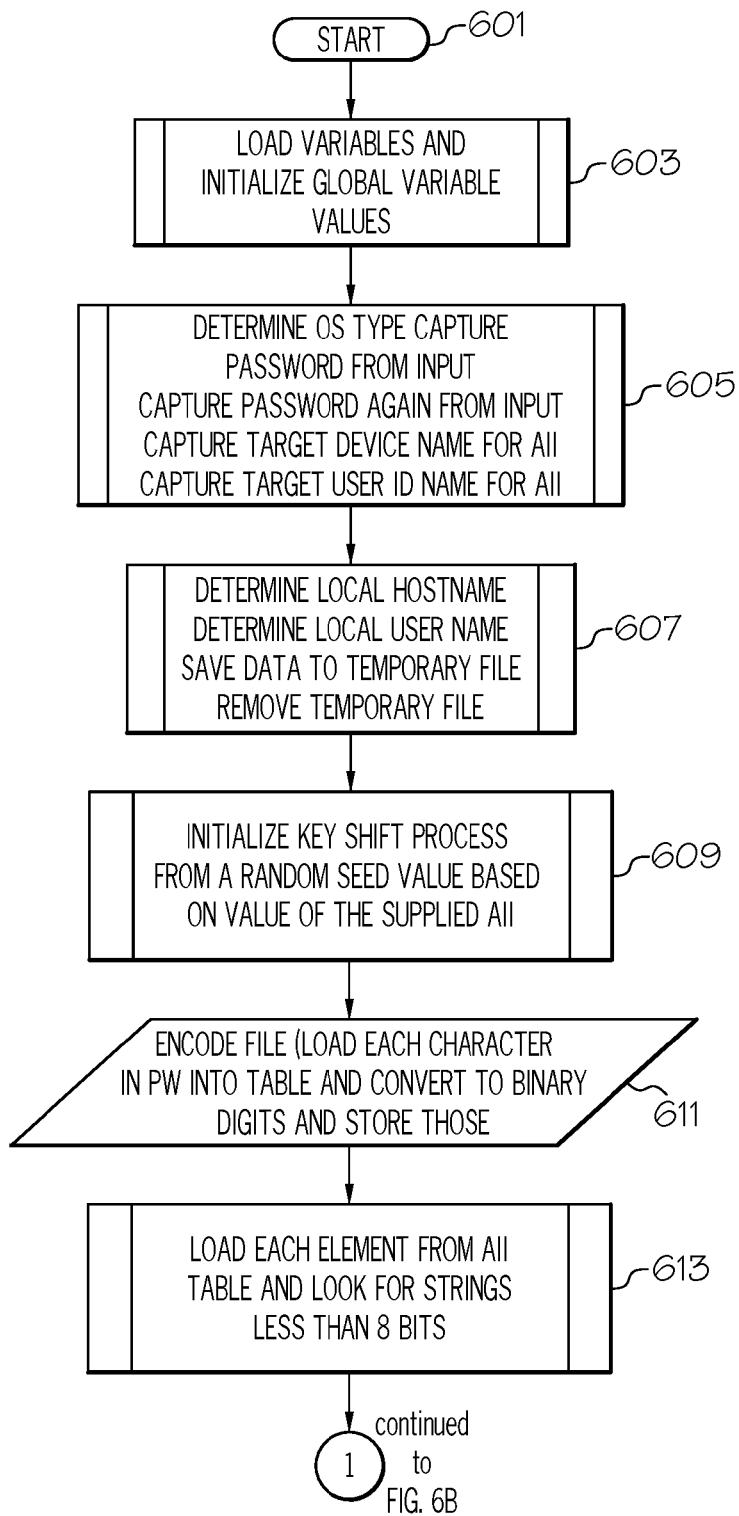

With reference now to FIG. 6, a detailed flow chart of one or more steps performed by one or more processors and/or other hardware devices to protect access to an appliance in accordance with one or more embodiments of the present invention is presented.

After initiator block 601, variables are loaded and initialized in a program running on the host system to create and use the AII 206, as described in block 603. This variable loading and initialization allows the host system to receive the user data 202 and to access the host ID 204, thus enabling the configuration of the AII 206 shown in FIG. 2.

As shown in block 605, the host system determines the operating system type being used by the client computer, and receives the user password, target device name/ID, User ID, and the client computer's network address (i.e., user data 202 shown in FIG. 2) from the client computer.

As shown in block 607, the host system retrieves host ID 204 to create, in combination with the user data 202, the AII 206 shown in FIG. 2.

As shown in block 609, the key shift process is initialized using the RNG 255 as described above (based on the value of the AII 206), and information from the client computer (e.g., the user password) is encoded using the key-shifted AII 206 by an XOR device, such as XOR device 212 shown in FIG. 2). The encoded password and other data is converted into binary form and stored (block 611).

A determination is made as to whether or not a particular section of the encoded string has less than 8 bits (block 613). If so (query block 615), then zeros are added to that section to bring it up to 8 bits (block 617). Otherwise, the padded key is loaded for later use (block 619).

As described in block 621, a hex encoded filename is generated based on the padded key value stored in block 619, thus allowing the system to work on any platform. The string of data is then assigned a filename value (block 623), and the filename is XORed with the key-shifted AII (block 625). This encoded binary value is then converted in to hexadecimal (block 627), and stored in a manner that only the authorized user can access using a particular operating system (block 629) and with the proper permission levels (block 631). The flow chart ends at terminator block 633.

In order to decrypt the encrypted value from block 631, the steps taken in the flow chart are performed in reverse order from block 629 to block 623.

Figure 7:
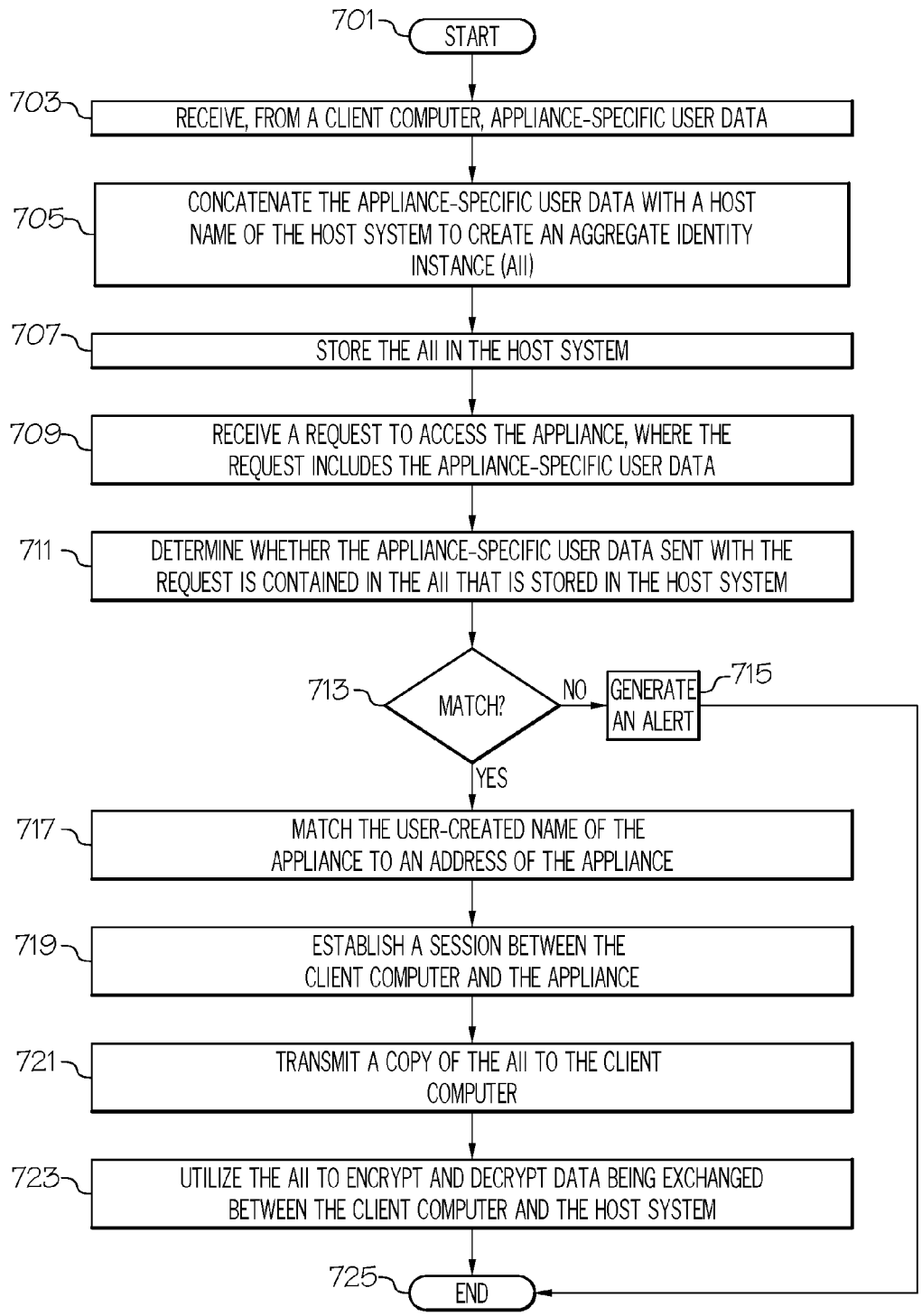
FIG. 7 is a high-level flow chart of one or more steps performed by one or more processors and/or other hardware devices to protect access to an appliance in accordance with one or more embodiments of the present invention.

With reference now to FIG. 7, a high-level flow chart of one or more steps performed by one or more processors and/or other hardware devices to protect access to an appliance in accordance with one or more embodiments of the present invention.

After initiator block 701, a host system (e.g., host system 201 shown in FIG. 2) receives, from a client computer (e.g., client computer 251), appliance-specific user data (e.g., user data 202), as shown in block 703. As described herein, the appliance-specific user data includes a user password, a user-created name of an appliance, a user identifier, and a network address of the client computer.

As shown in block 705, the host system concatenates the appliance-specific user data with a host name (e.g., host ID 204) of the host system to create an Aggregate Identity Instance (AII) (e.g., AII 206 shown in FIG. 2).

As shown in block 707, one or more processors (e.g., within the host system) store the AII in the host system.

Thereafter, the host system receives, from the client computer, a request to access the appliance (e.g., target device 253), as described in block 709. The request includes the appliance-specific user data 202 (or at least a version thereof).

As shown in block 711, the host system determines whether or not the appliance-specific user data sent with the request is contained in the AII that is stored in the host system (i.e., whether the user data sent with the request for access to the target device/appliance matches what was used to create the AII).

If not (query block 713), then the host system 201 determines that the request is not legitimate (e.g., is coming from unauthorized computer 210 shown in FIG. 2), and an alert is generated for the host system (block 715).

However, if the data sent with the request is contained in the AII that is stored in the host system (query block 713), then the host system matches the user-created name of the appliance to an address of the appliance (e.g., using target device lookup table 208), as shown in block 717. This allows the host system 201 to establish a session between the client computer and the appliance (block 719).

In order to enable the client computer 251 to encode and decode data coming from the host system 201, a copy of the AII 206 is sent to the client computer 251 (as well as instructions to create the RNG 255 in the client computer 251, if it does not already exist within the client computer 251), as described in block 721.

As described in block 723, the host system and/or the client computer 251 thus utilizes the AII to encrypt and decrypt data being exchanged between the client computer and the host system.

The flow chart ends at terminator block 725.

As described herein, in an embodiment of the present invention, the AII is input into a pseudo-random number generator to identify the starting location of the AII for use in encrypting/decrypting data (e.g., using XOR 212). This same process can be used in the client computer 251 using XOR 214 (similar to XOR 212) and/or target device 253 using XOR 216 (also similar to XOR 212).

Thus, in one embodiment of the present invention the host system inputs the AII into a random number generator to create a starting location identifier, where the starting location identifier identifies a starting location on the AII to use when encrypting and decrypting data, and then utilizes the starting location identifier when encrypting and decrypting data being exchanged between the client computer and the host system.

Similarly, in one embodiment of the present invention the host system transmits the AII to the client computer. Thereafter, the client computer inputs the AII into a random number generator to create a starting location identifier. The starting location identifier identifies a starting location on the AII to use when encrypting and decrypting data, and the client computer utilizes the starting location identifier when encrypting and decrypting data being exchanged between the client computer and the host system.

Similarly, in one embodiment of the present invention the host system transmits a copy of the AII to the appliance, which inputs the AII into a random number generator to create a starting location identifier. The starting location identifier identifies a starting location on the AII to use when encrypting and decrypting data, and the appliance utilizes the starting location identifier when encrypting and decrypting data being exchanged between the appliance and the host system.

In an embodiment of the present invention, the user of the client computer is limited to certain access (e.g., certain hardware devices such as storage devices, controllers for machinery, processors, etc.) based on their authorization level. This authorization level is ascertained by the host system base matching the user identifier (in the AII) to a user authorization level (e.g., from a lookup table). The host system thereafter limits interactions, processes, actions, etc. between the client computer and the appliance according to the user authorization level.

As described herein, in one or more embodiments of the present invention the random number generator (more accurately the pseudo-random number generator) is a hardware circuit.

As described herein, in one or more embodiments of the present invention the appliance (e.g., target device 253) is a hardware device.

As described herein, in one or more embodiments of the present invention the appliance is a software resource (e.g., a software application).

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
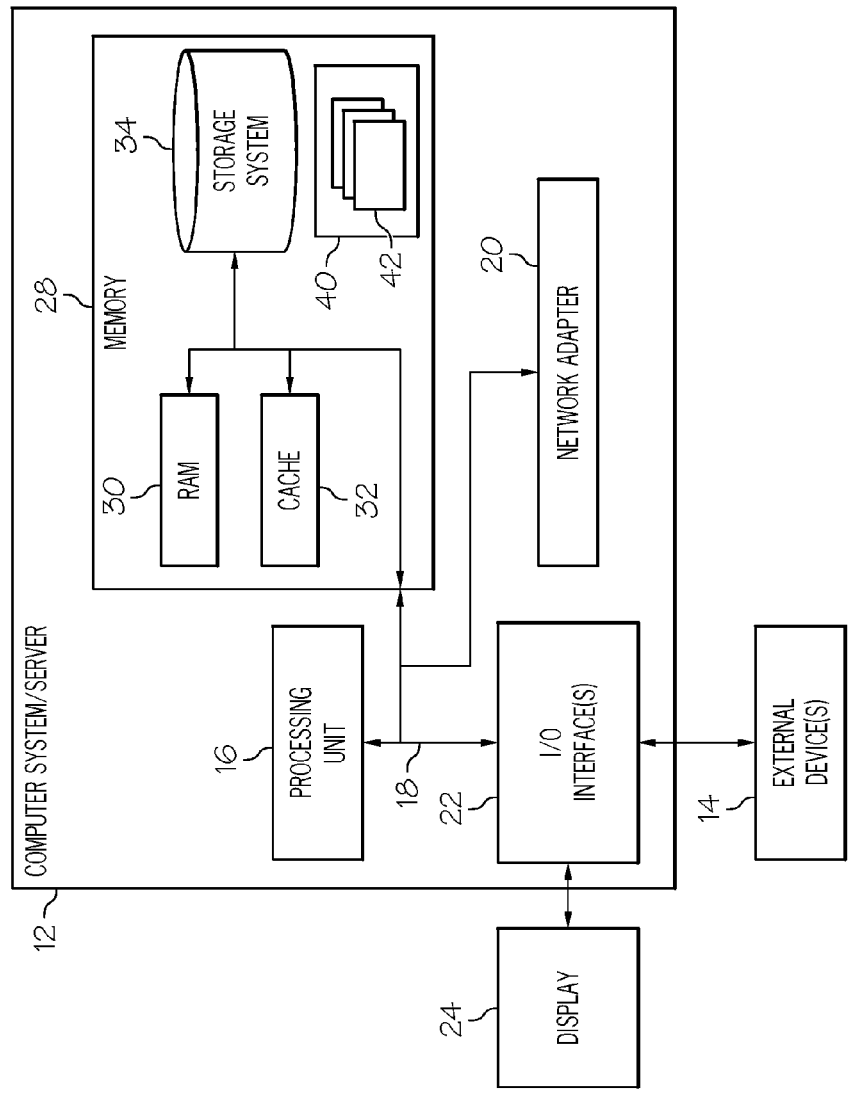
FIG. 8 depicts a cloud computing node according to an embodiment of the present disclosure.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
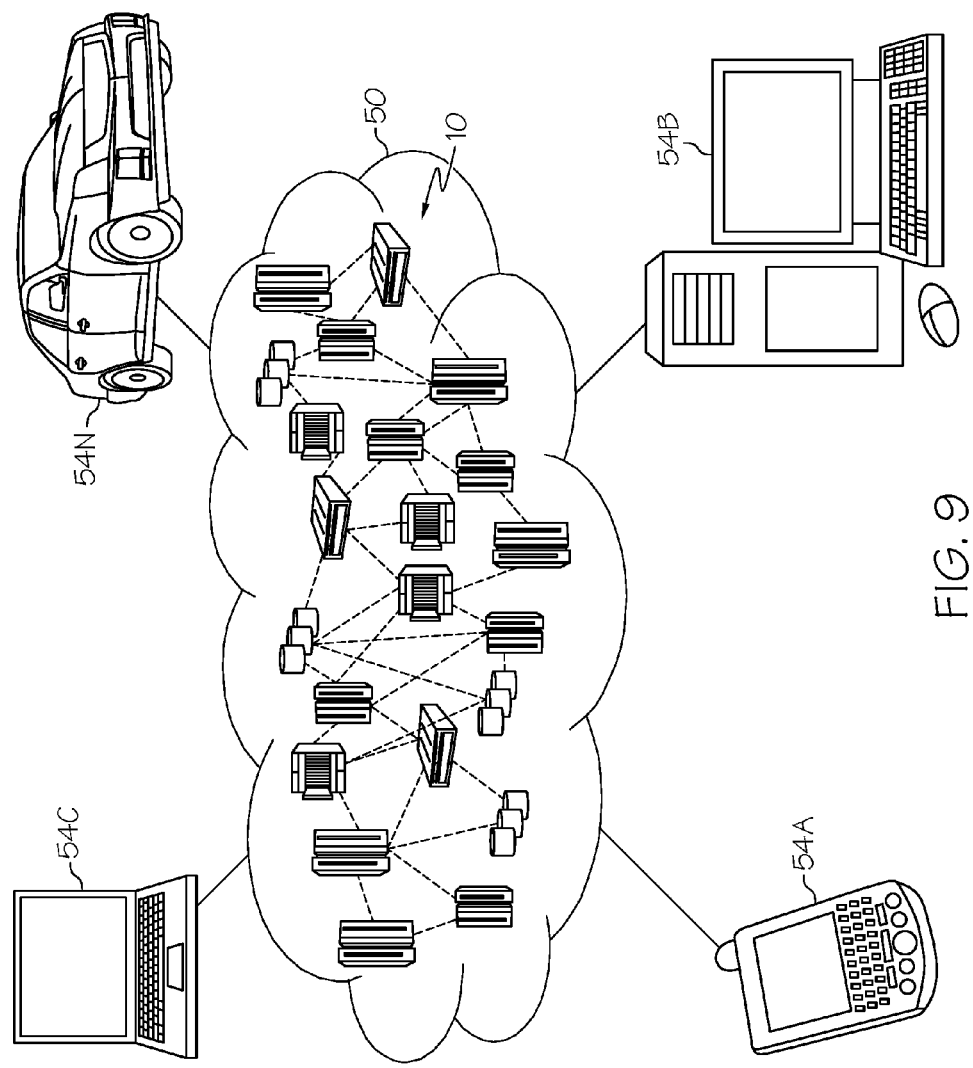
FIG. 9 depicts a cloud computing environment according to an embodiment of the present disclosure.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
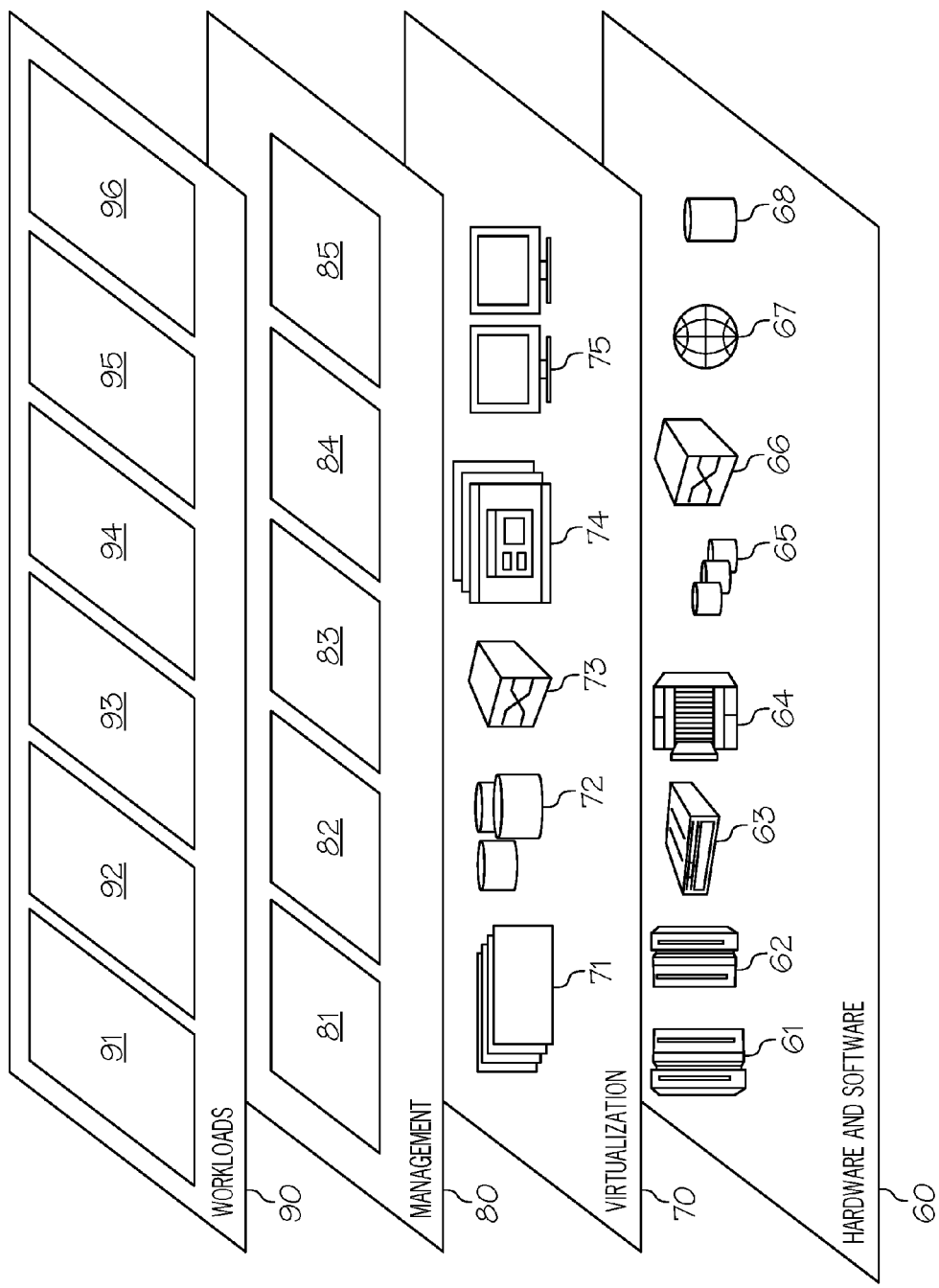
FIG. 10 depicts abstraction model layers according to an embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hardware access control processing 96 (for controlling access to a hardware device through utilization of an Aggregate Identity Instance (AII) as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of controlling access to an appliance, the computer-implemented method comprising:
    receiving, from a client computer and by a host system, appliance-specific user data, wherein the appliance-specific user data includes a user password, a user-created name of an appliance, a user identifier, and a network address of the client computer;

concatenating, by the host system, the appliance-specific user data with a host name of the host system to create an Aggregate Identity Instance (AII);
storing, by one or more processors, the AII in the host system;
receiving, from the client computer and by the host system, a request to access the appliance, wherein the request includes the appliance-specific user data;
determining, by the host system, whether the appliance-specific user data sent with the request is contained in the AII that is stored in the host system;
in response to determining that the appliance-specific user data sent with the request is contained in the AII that is stored in the host system, the host system:
matching the user-created name of the appliance to an address of the appliance; establishing a session between the client computer and the appliance; and transmitting a copy of the AII to the client computer;
and utilizing, by the host system, a starting location on the AII to encrypt and decrypt data being exchanged between the client computer and the host system.

2. The computer-implemented method of claim 1, further comprising:
inputting, by the host system, the AII into a random number generator to create a starting location identifier, wherein the starting location identifier identifies the starting location on the AII to use when encrypting and decrypting data; and
utilizing, by the host system, the starting location identifier when encrypting and decrypting data being exchanged between the client computer and the host system.

3. The computer-implemented method of claim 1, further comprising:
transmitting, from the host system to the client computer, the AII, wherein the client computer inputs the AII into a random number generator to create a starting location identifier, wherein the starting location identifier identifies the starting location on the AII to use when encrypting and decrypting data, and wherein the client computer utilizes the starting location identifier when encrypting and decrypting data being exchanged between the client computer and the host system.

4. The computer-implemented method of claim 1, further comprising:
transmitting, from the host system to the appliance, a copy of the AII, wherein the appliance inputs the AII into a random number generator to create a starting location identifier, wherein the starting location identifier identifies the starting location on the AII to use when encrypting and decrypting data, and wherein the appliance utilizes the starting location identifier when encrypting and decrypting data being exchanged between the appliance and the host system.

5. The computer-implemented method of claim 1, further comprising:
matching, by the host system, the user identifier to a user authorization level; and
limiting, by the host system, interactions between the client computer and the appliance according to the user authorization level.

6. The computer-implemented method of claim 1, wherein the random number generator is a hardware circuit.

7. The computer-implemented method of claim 1, wherein the appliance is a hardware device.

8. The computer-implemented method of claim 1, wherein the appliance is a software resource.

9. A computer program product for controlling access to an appliance, the computer program product comprising a non-transitory computer readable storage medium having program code embodied therewith, the program code readable and executable by a processor to perform a method comprising:
receiving, from a client computer, appliance-specific user data, wherein the appliance-specific user data includes a user password, a user-created name of an appliance, a user identifier, and a network address of the client computer;
concatenating, by the host system, the appliance-specific user data with a host name of the host system to create an Aggregate Identity Instance (AII); storing the AII in the host system;
receiving, from the client computer, a request to access the appliance, wherein the request includes the appliance-specific user data;
determining, by the host system, whether the appliance-specific user data sent with the request is contained in the AII that is stored in the host system;
in response to determining that the appliance-specific user data sent with the request is contained in the AII that is stored in the host system:
matching the user-created name of the appliance to an address of the appliance; establishing a session between the client computer and the appliance;
and transmitting a copy of the AII to the client computer;
and utilizing, by the host system, a starting location on the AII to encrypt and decrypt data being exchanged between the client computer and the host system.

10. The computer program product of claim 9, wherein the method further comprises: inputting the AII into a random number generator to create a starting location identifier, wherein the starting location identifier identifies the starting location on the AII to use when encrypting and decrypting data; and
utilizing the starting location identifier when encrypting and decrypting data being exchanged between the client computer and the host system.

11. The computer program product of claim 9, wherein the method further comprises:
transmitting, to the client computer, the AII, wherein the client computer inputs the AII into a random number generator to create a starting location identifier, wherein the starting location identifier identifies the starting location on the AII to use when encrypting and decrypting data, and wherein the client computer utilizes the starting location identifier when encrypting and decrypting data being exchanged between the client computer and the host system.

12. The computer program product of claim 9, wherein the method further comprises: transmitting, to the appliance, a copy of the AII, wherein the appliance inputs the AII into a random number generator to create a starting location identifier, wherein the starting location identifier identifies the starting location on the AII to use when encrypting and decrypting data, and wherein the appliance utilizes the starting location identifier when encrypting and decrypting data being exchanged between the appliance and the host system.

13. The computer program product of claim 9, wherein the method further comprises:
matching the user identifier to a user authorization level; and
limiting interactions between the client computer and the appliance according to the user authorization level.

14. The computer program product of claim 9, wherein the random number generator is a hardware circuit.

15. The computer program product of claim 9, wherein the appliance is a hardware device.

16. The computer program product of claim 9, wherein the appliance is a software resource.

17. A computer system comprising:
   a processor, a computer readable memory, and a non-transitory computer readable storage medium;
   first program instructions to receive, from a client computer, appliance-specific user data, wherein the appliance-specific user data includes a user password, a user-created name of an appliance, a user identifier, and a network address of the client computer;
   second program instructions to concatenate the appliance-specific user data with a host name of the host system to create and store an Aggregate Identity Instance (AII) in a host system;
   third program instructions to receive, from the client computer, a request to access the appliance, wherein the request includes the appliance-specific user data;
   fourth program instructions to determine whether the appliance-specific user data sent with the request is contained in the AII stored in the host system;
   fifth program instructions to, in response to determining that the appliance-specific user data sent with the request is contained in the AII stored in the host system: match the user-created name of the appliance to an address of the appliance; establish a session between the client computer and the appliance; and transmit a copy of the AII to the client computer;
   and sixth program instructions to utilize a starting location on the AII to encrypt and decrypt data being exchanged between the client computer and the host system; and wherein
   the first, second, third, fourth, fifth, and sixth program instructions are stored on the non-transitory computer readable storage medium for execution by one or more processors via the computer readable memory.

18. The computer system of claim 17, further comprising:
   seventh program instructions to match the user identifier to a user authorization level; and
   eighth program instructions to limit interactions between the client computer and the appliance according to the user authorization level; and wherein
   the seventh and eighth program instructions are stored on the non-transitory computer readable storage medium for execution by one or more processors via the computer readable memory.

19. The computer system of claim 17, wherein the random number generator is a hardware circuit.

20. The computer system of claim 17, wherein the appliance is a hardware device.

* * * * *